United States Patent [19]

Strickler et al.

[11] Patent Number: 4,523,460
[45] Date of Patent: Jun. 18, 1985

[54] FLUID MEASURING, TESTING AND ACCOUNTING SYSTEM

[75] Inventors: Steven E. Strickler, Jamestown; Jerry C. Simmons, Broomfield, both of Colo.; James Golladay, Jackson, Wyo.; Andrew D. Goldstein, Boulder, Colo.

[73] Assignee: Montech Systems Incorporated, Boulder, Colo.

[21] Appl. No.: 558,594

[22] Filed: Dec. 6, 1983

[51] Int. Cl.³ .................... G01F 15/02; G01F 15/06; G01F 15/08; G01F 23/00
[52] U.S. Cl. ........................................ 73/200; 73/198; 73/292; 340/870.11; 340/870.16; 364/509
[58] Field of Search ............. 73/290 V, 291, 292, 73/149, 195, 198, 200, 61.1 R; 340/870.16, 825.15, 870.11; 314/509; 374/142

[56] References Cited

U.S. PATENT DOCUMENTS

| | | | |
|---|---|---|---|
| 3,107,526 | 10/1963 | Kuntz | 73/200 X |
| 3,135,113 | 6/1964 | Walker et al. | 73/200 |
| 4,162,473 | 7/1979 | Utasi | 73/292 X |
| 4,229,798 | 10/1980 | Rosie et al. | 73/290 V X |
| 4,236,144 | 11/1980 | Sunagawa | 73/292 X |
| 4,264,788 | 4/1981 | Keidel et al. | 340/621 X |
| 4,275,382 | 6/1981 | Jannotta | 340/870.16 |
| 4,387,434 | 6/1983 | Moncrief, Jr. et al. | 340/870.16 X |

*Primary Examiner*—Charles A. Ruehl
*Attorney, Agent, or Firm*—Sherman & Shalloway

[57] ABSTRACT

A system which enables the measuring, testing and accounting for a fluid, preferably oil, as stored in a tank battery adjacent a producing oil well system. In its most basic form, the system includes a master control unit associated with a level transducer for each tank, basic sediment and water monitors for various conduits within the system, temperature sensors for each tank and the various conduits, and a data collection box for transferring data stored in the master control unit after a predetermined amount of time has transpired. Several options are available with this system and these include telemetry options for remote reporting of the various parameters of the system and various alarm and theft prevention devices.

28 Claims, 13 Drawing Figures

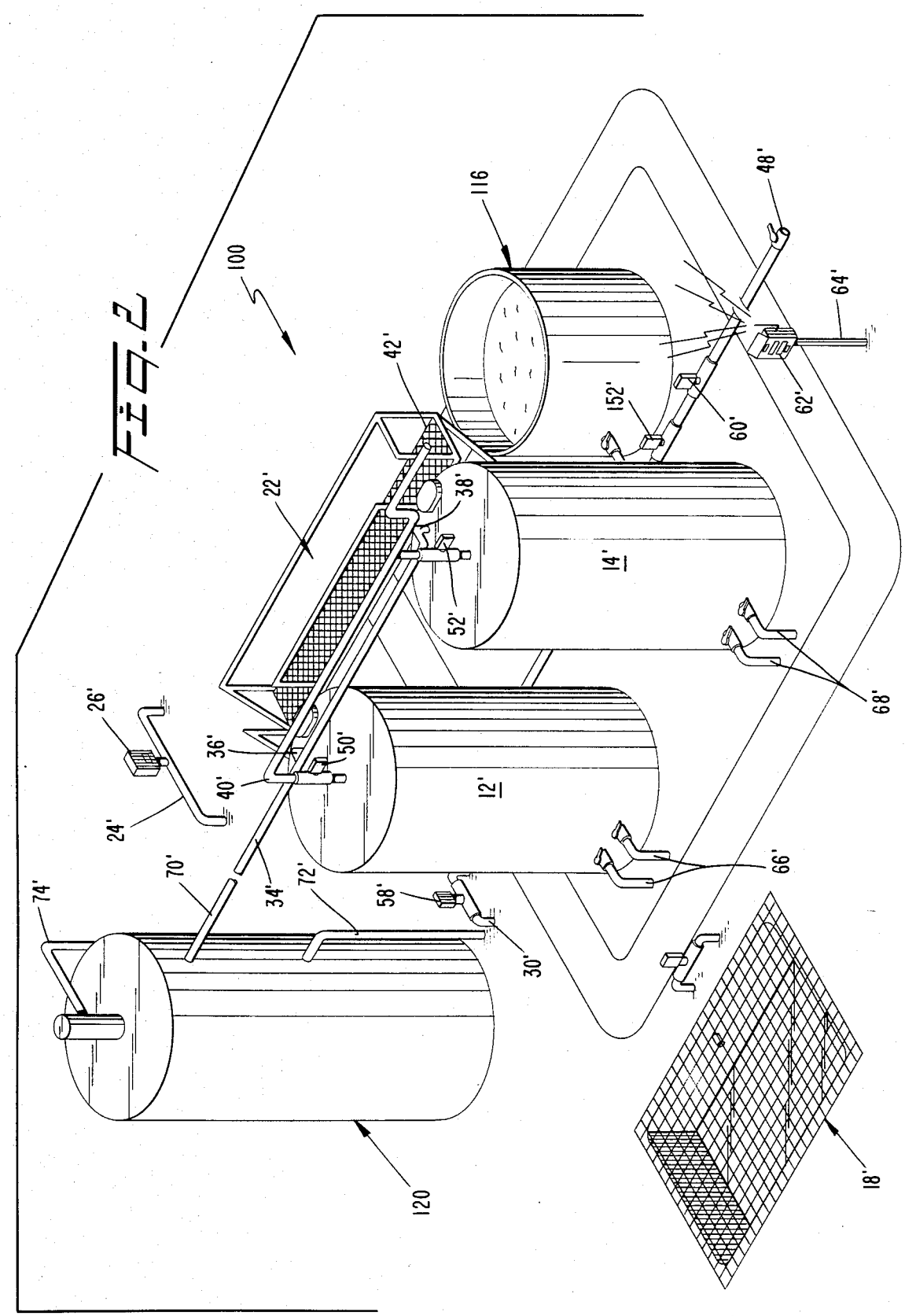

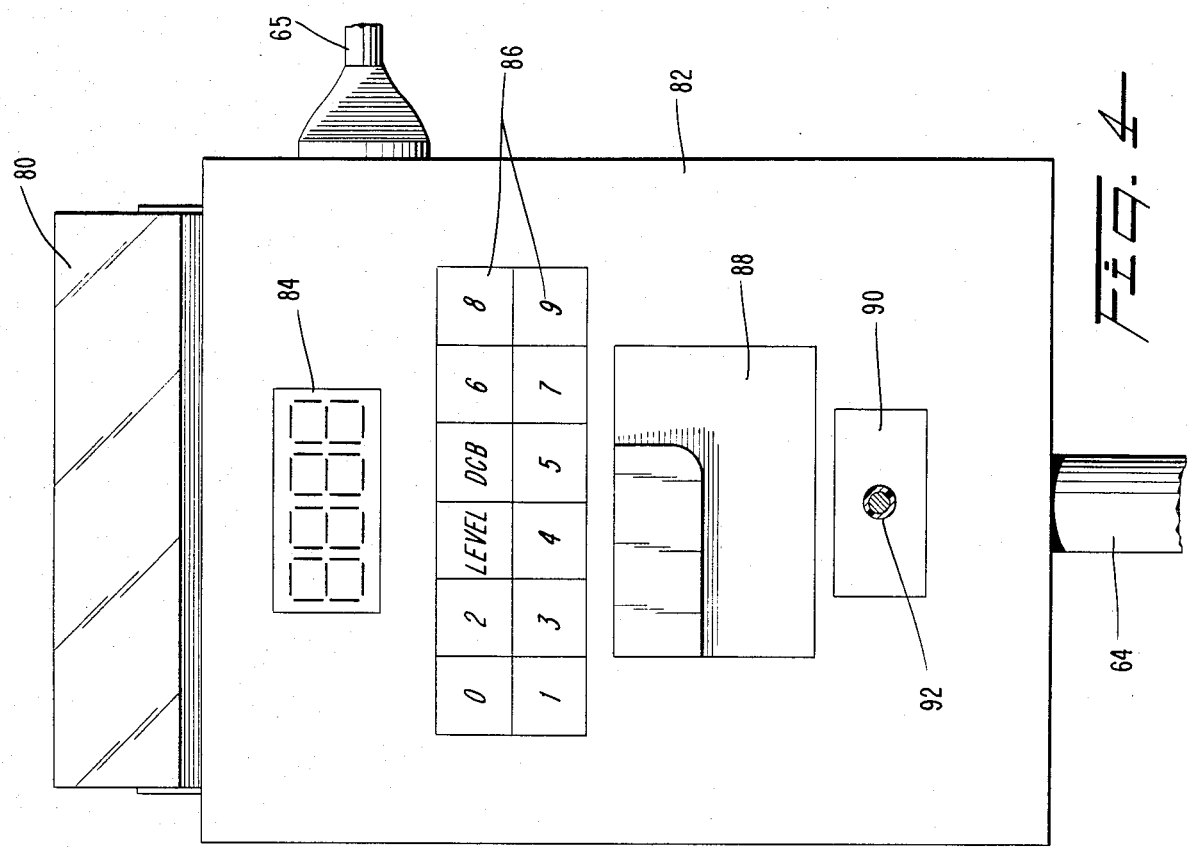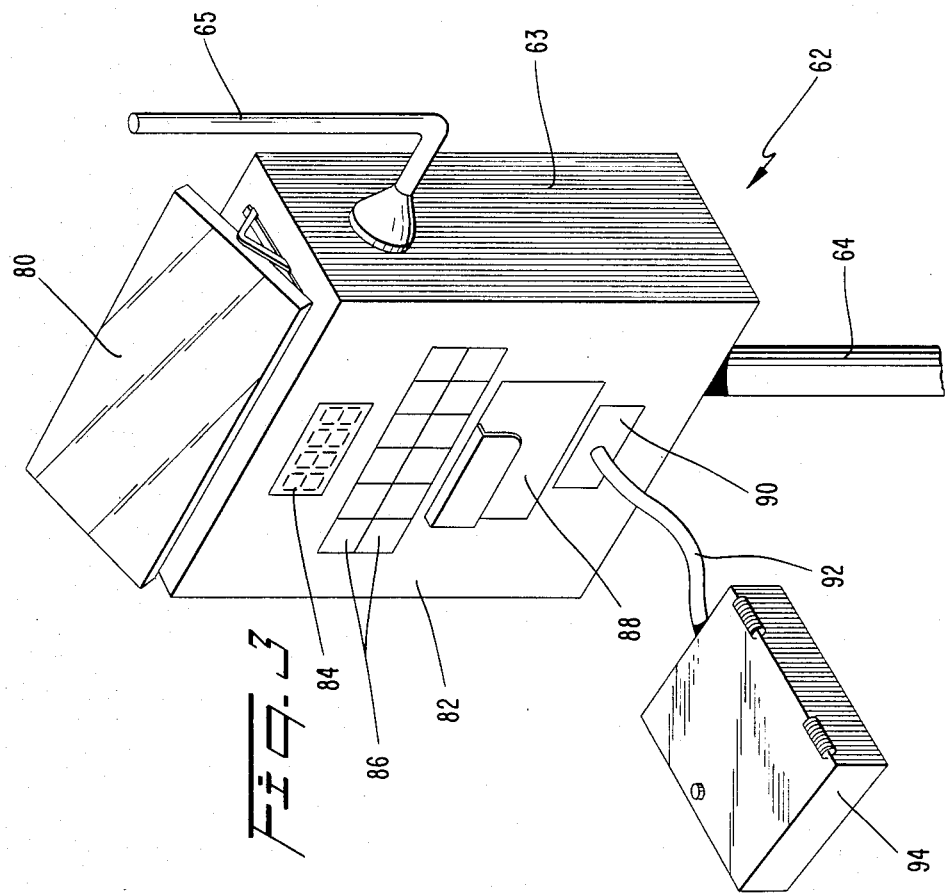

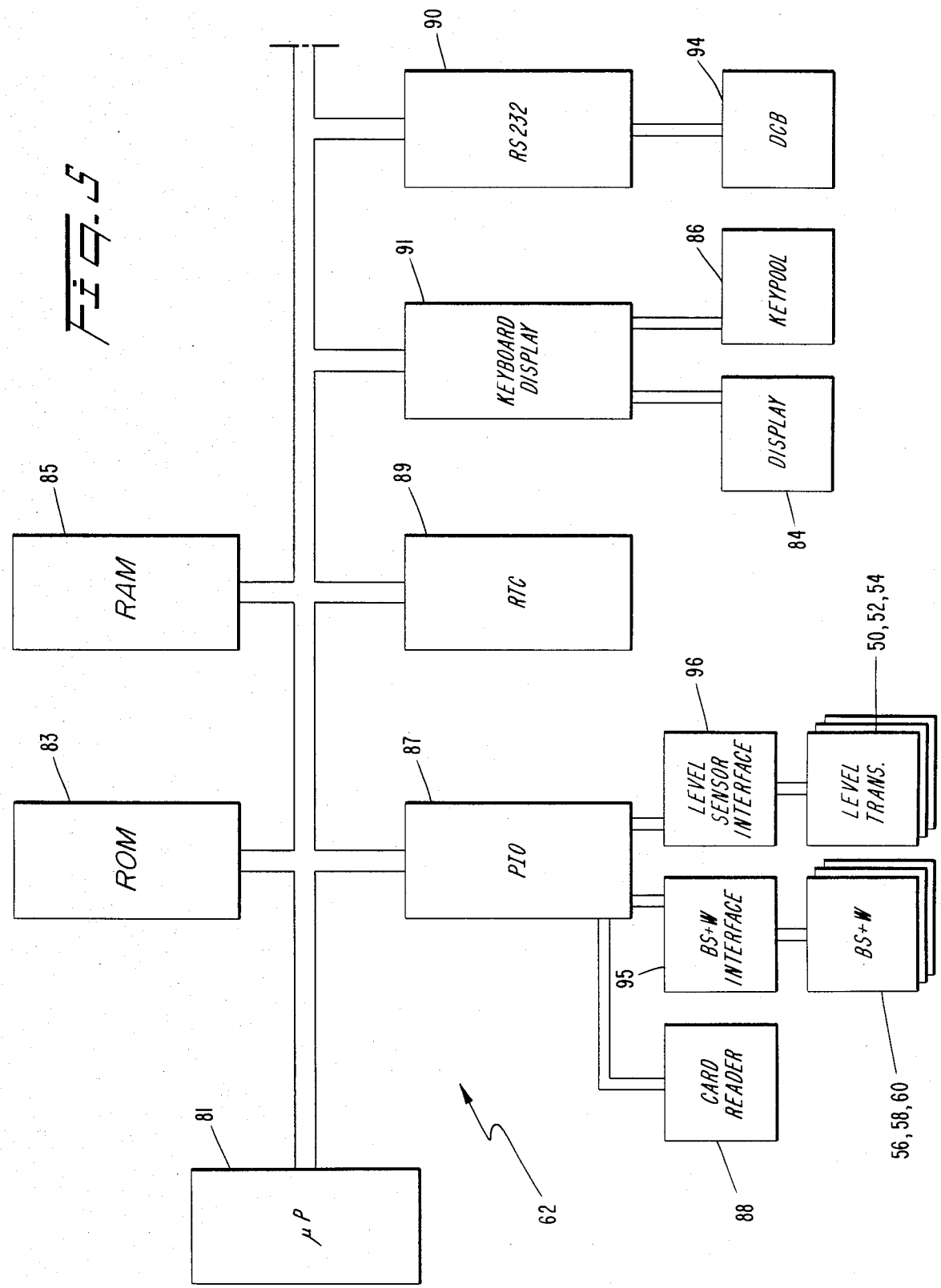

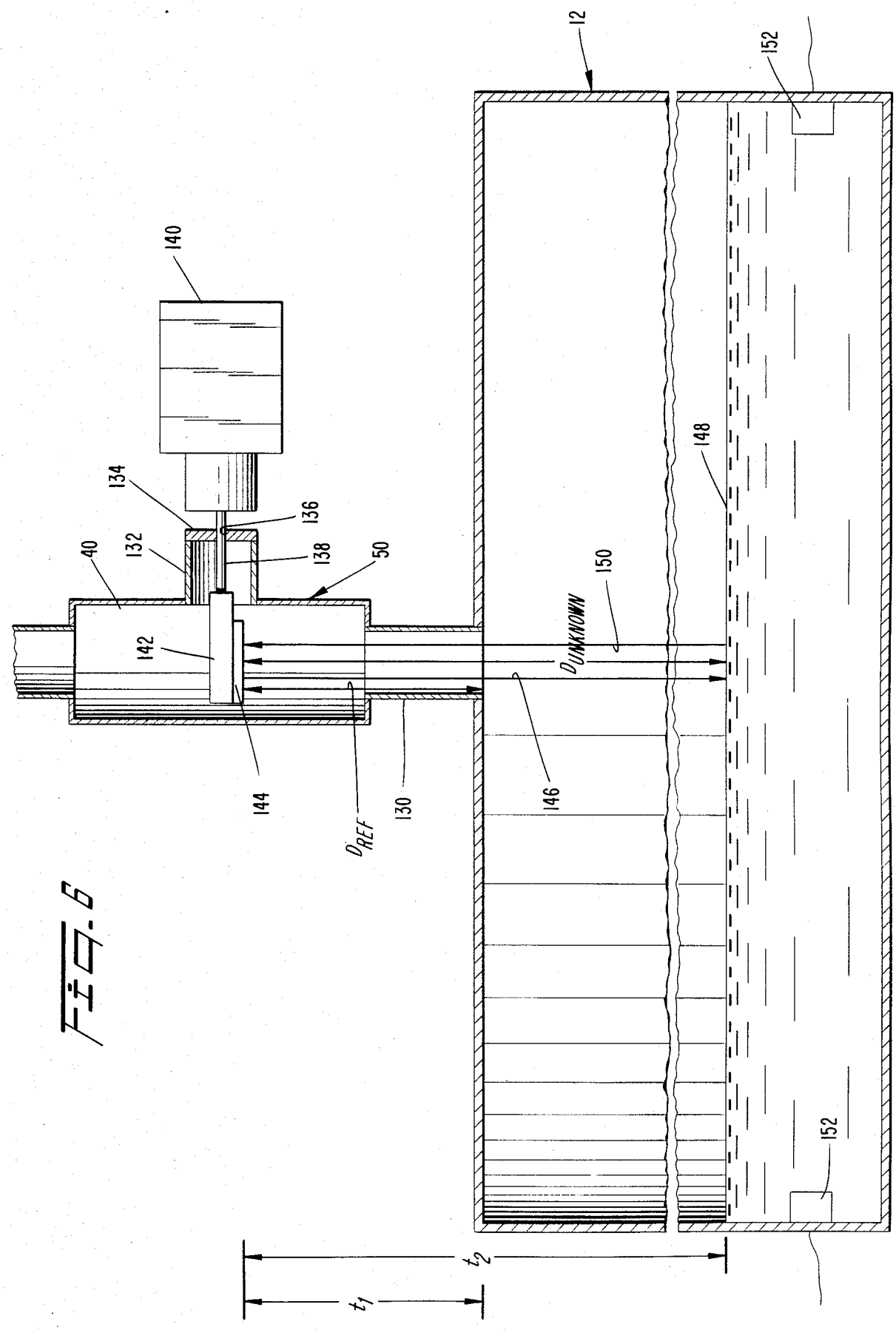

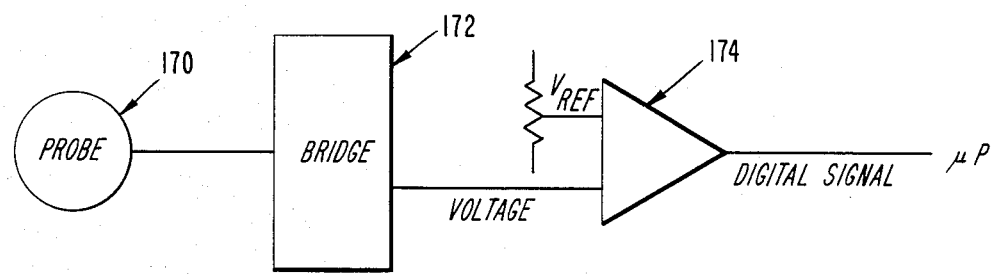
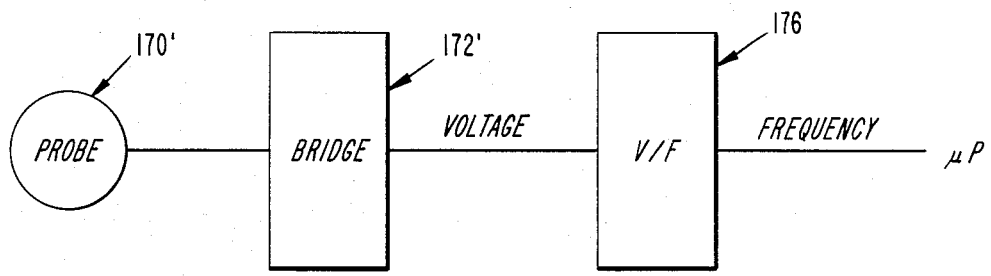
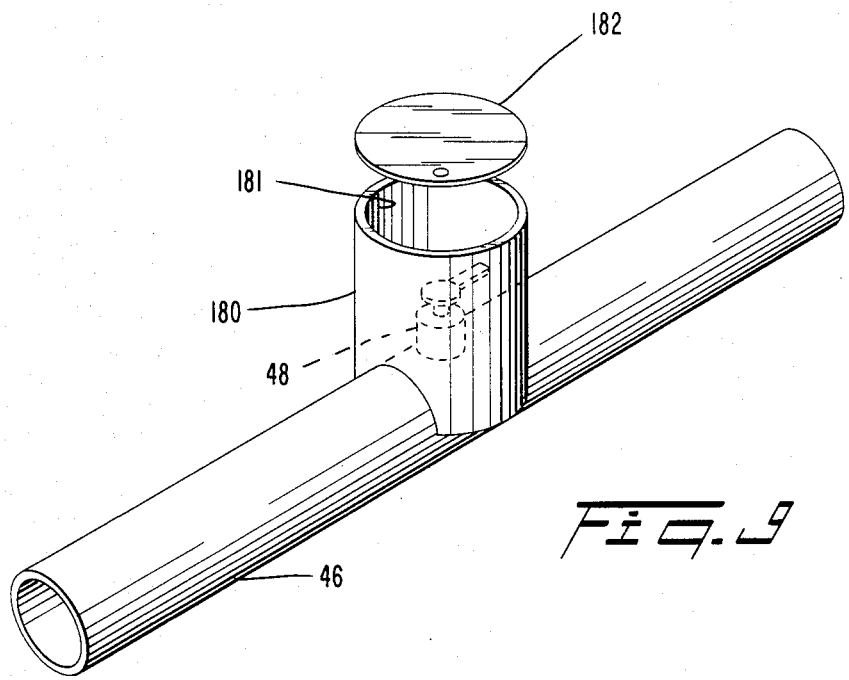

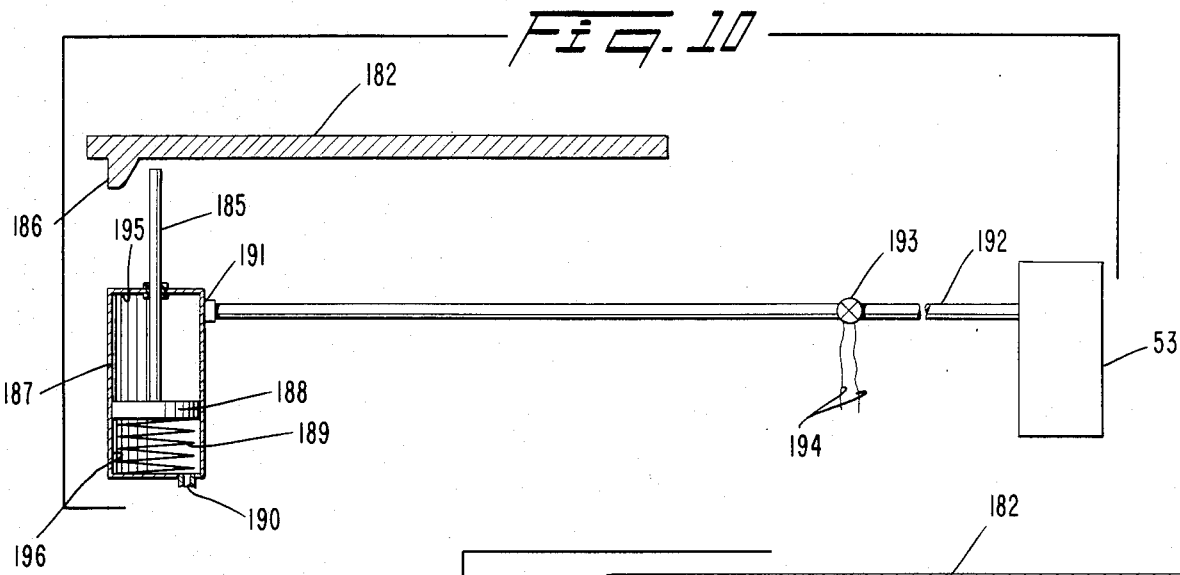
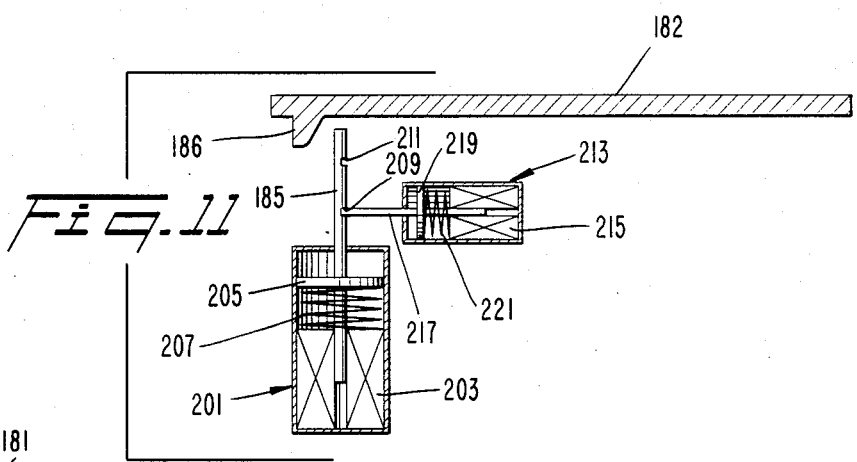
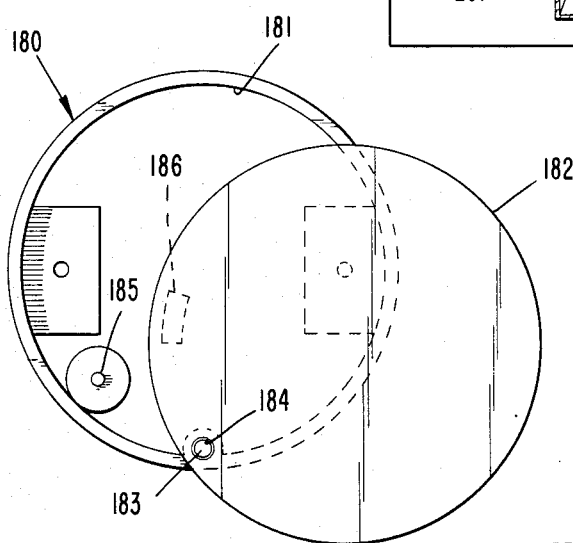
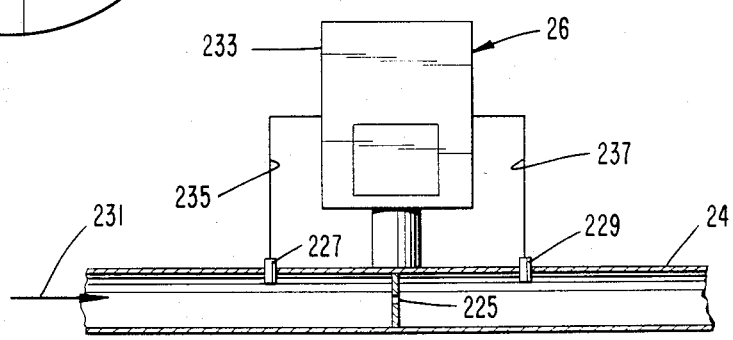

FLUID MEASURING, TESTING AND ACCOUNTING SYSTEM

BACKGROUND OF THE INVENTION

This invention relates to a system for measuring, testing and accounting for fluids, preferably oil in a tank battery. Field production and/or inventory status are subject to error because of inaccurate and non-verifiable methods of measurement and reporting. It has been estimated by industry sources that approximately 2% of all oil production is lost in the field before any permanent record of this production is made. Approximately 90% of those losses are never detected and of those losses that are detected few are reported. The primary feature, common to most losses is "under-reporting." Further, upsets in heater/treater systems, overflow conditions in tanks, pump failures and other problems may under normal conditions go undetected for lengthy periods and thus cause significant losses to occur. Further, the failure to compensate for volume variance due to temperature variance in the oil may cause as much as a two to three percent variance in the amount of oil accounted for at the tank battery. Further, a common short coming of tank batteries comprises their lack of an accurate means for measuring the basic sediment and water content of the oil which is being sold to the consumers.

Another problem involves the recent enactment of Federal Regulations which will require for all operators a satisfactory lease site security plan for all Federal and Indian leases. Whether the leases are Federal or fee, remote lease storage tanks have proven to be the best place to steal oil for the following reasons:

(1) Oil volumes at the tank battery are quite often as yet undocumented;

(2) Fluctuations in production enable the hiding of such theft;

(3) There are a large number of remote unattended battery sites thus limiting the amount of patrolling possible thereof; and (4) At any given moment, there are many vehicles on any particular lease which are capable of transporting oil, and it is difficult to prove whether or not oil has been stolen by one of these vehicles.

The following prior art is known to applicant: U.S. Pat. Nos. 3,665,167, 3,673,569, 3,975,622, 4,064,501, 4,229,798, 4,248,087, 4,264,788, 4,301,444 and 4,340,938.

SUMMARY OF THE INVENTION

The above problems evident in the prior art are overcome by the present invention which provides continuous measurement of oil inventories at remote or unattended tank battery sites. Measurement results are accumulated by a self contained on site data storage system. Oil quality and temperature are monitored and recorded both during transactions and at predetermined intervals of time to assure accurate reporting of oil sales at the time of transfer whether authorized or otherwise. The system is controlled by a self contained power source which is provided to enable installation of the system at remote locations and optional features including telemetry options and alarm options are available. The system continuously monitors production rates with an accuracy of approximately 99.7%. If any significant aberation from the preset standards occurs, an alarm may be triggered and a record is made. In tamperproof fashion, all results are recorded in a temporary memory in the master control unit which may be transferred as explained below to a portable memory device. The temperature of the oil is measured so as to enable compensation for variance of the oil volume with temperature at the time of custody transfer thereof. In order to ensure the quality of the oil which is being dispensed, the system automatically measures and records the precise basic sediment and water content of the oil at the time of transfer and during periodic predetermined system activations. The above noted recently enacted Federal Regulations are complied with by designing the system so as to meet their requirements by automatically monitoring production and equipment operating parameters. The operating company is altered whenever unauthorized oil withdrawals or abnormal equipment operating conditions have occurred.

The basic system as embodied in the present invention consists of an environmentally protected microprocessor package mounted a short distance from the tank battery, which package comprises a master control unit including a card reader, a display, a key pad to access data, a set of electronic boards contained therein and a solar cell charger for keeping the battery power up to desired levels. A connector designated "RS 232" is mounted on the face of the master control unit for connection to the portable data collection device. Each tank in the battery in the basic system will include a level sensor, a plurality of temperature sensors and means connecting the sensors to the master control unit. Various conduits within the tank battery will include therein basic sediment and water sensors and temperature sensors which enable the determination of the quality of the oil in the lines.

The device as embodied in the present invention has several advantages over the prior art as follows:

(a) the system gives a more precise measurement at the point of sale than the previous manual methods;

(b) the system provides permanent records of all of the following: data at the time of sale, production rates at all times, and rate of change of production;

(c) the system provides data as to when an overt theft has occurred;

(d) the system provides a means for reading data to a tape device, bubble memory or other portable storage device;

(e) the system provides a record of all unauthorized removals that are not overt theft, such as, for example, when an employee of the operating company is authorized to clean a tank and during such authorization steals oil;

(f) the system monitors all authorized withdrawals with respect to time, quality, temperature and quantity;

(g) the system provides continuous separated water quality monitoring at the water tank;

(h) The system further provides continuous water content monitoring and continuous temperature monitoring at the point of sale;

(i) the system is protected in such a way that data can only be accessed by an authorized personnel having a coded card and further having a security password to be entered into the input device on the master control unit in conjunction with the insertion of the card in the manual card reader thereof;

(j) the system acts as a time clock so as to enable the recording of when authorized persons were at the battery.

The system includes several potential options for expansion of the flexibility of the device. For example:

(a) the system may be equipped with a set of relay closure alarming circuits of different types which enable it to (1) sound an alarm when unauthorized withdrawals occur, (2) sound an alarm when malfunctions of the heat/treater or gravitational separator occur, and (3) sound an alarm when another type of failure occurs such as, for example, tank overflow situation or failure of the pumps to operate.

(b) the system may be equipped with telemetry devices such as a radio or infrared transmitter-receiver which enables it to (1) transmit alarms to a central location within the range of radio signal to dispatch maintenance personnel; (2) start a recording camera during various predetermined situations such as when theft has been detected; (3) release marking systems such as a celluloid or chemical identifier into the oil upon detection of the commencement of an unauthorized withdrawal; (4) transmit data to overflying aircraft for retransmission to a central facility during certain conditions of operation of the device; this mode may include transmission via satellite; and (5) the system may be instructed remotely to perform a function such as that of opening or closing a valve or alternatively testing a particular conduit with the basic sediments and water sensor pertaining thereto.

(c) the system may be equipped to measure and record gas production associated with the subject oil. This may be accomplished through measurement of the pressure drop across an orifice from which flow rate may be calculated. The system may also record the pressure in various feeder lines such as, for example, from multiple wells feeding the tank battery.

(d) the system may include a printer option for printing gauge sheets, run tickets, receipts or other written data at the tank battery site.

Accordingly, it is an object of the present invention to provide a fluid measuring, testing and accounting system adaptable to a tank battery at a site preferably associated with the collection of oil or oil and gas from an oil well.

It is a further object of the present invention to provide such a system which will include a master control unit for receiving signals from level, temperature, pressure and quality sensors.

It is a still further object of the present invention to provide the master control unit with a card reader, input key pad, display and data removal interface.

It is a yet further object of the present invention to provide the system with a portable memory device which may remove the stored memory in the master control unit after predetermined or random increments of time.

It is a yet further object of the invention to provide such a system with telemetry options for remotely transmitting data to a control facility and remotely controlling the operation of the system.

It is a further object of the present invention to provide such a system with alarm options for deterring, detecting and reporting unauthorized removals of the fluid from the tank battery.

These and other objects of this invention will become apparent to those skilled in the art upon consideration of the following specification when read in conjunction with the attached figures of drawings.

BRIEF DESCRIPTION OF THE DRAWINGS

FIG. 2 shows a perspective view of a second embodiment of tank battery in accordance with the present invention.

FIG. 3 shows a close up perspective view of the master control unit and portable memory device as applied to the present invention.

FIG. 4 shows a front view of the control panel of the master control unit of FIG. 3.

FIG. 5 shows a block diagram of the circuitry contained within the master control unit shown in FIGS. 3 and 4.

FIG. 6 shows a schematic view of a typical tank including level transducer mounted thereon.

FIG. 7 shows a circuit diagram for a first embodiment of basic sediments and water sensor.

FIG. 8 shows a circuit diagram for a second embodiment of basic sediments and water sensor.

FIG. 9 shows a perspective view of a system valve with lock assembly mounted thereover.

FIG. 10 shows a schematic view of a first embodiment of latch therefor.

FIG. 11 shows a schematic view of a second embodiment of latch therefor.

FIG. 12 shows a top view of the lock assembly with the cover partially pivoted away.

FIG. 13 shows a schematic view of a gas line production monitoring system.

DESCRIPTION OF THE PREFERRED EMBODIMENTS

Figure 1:
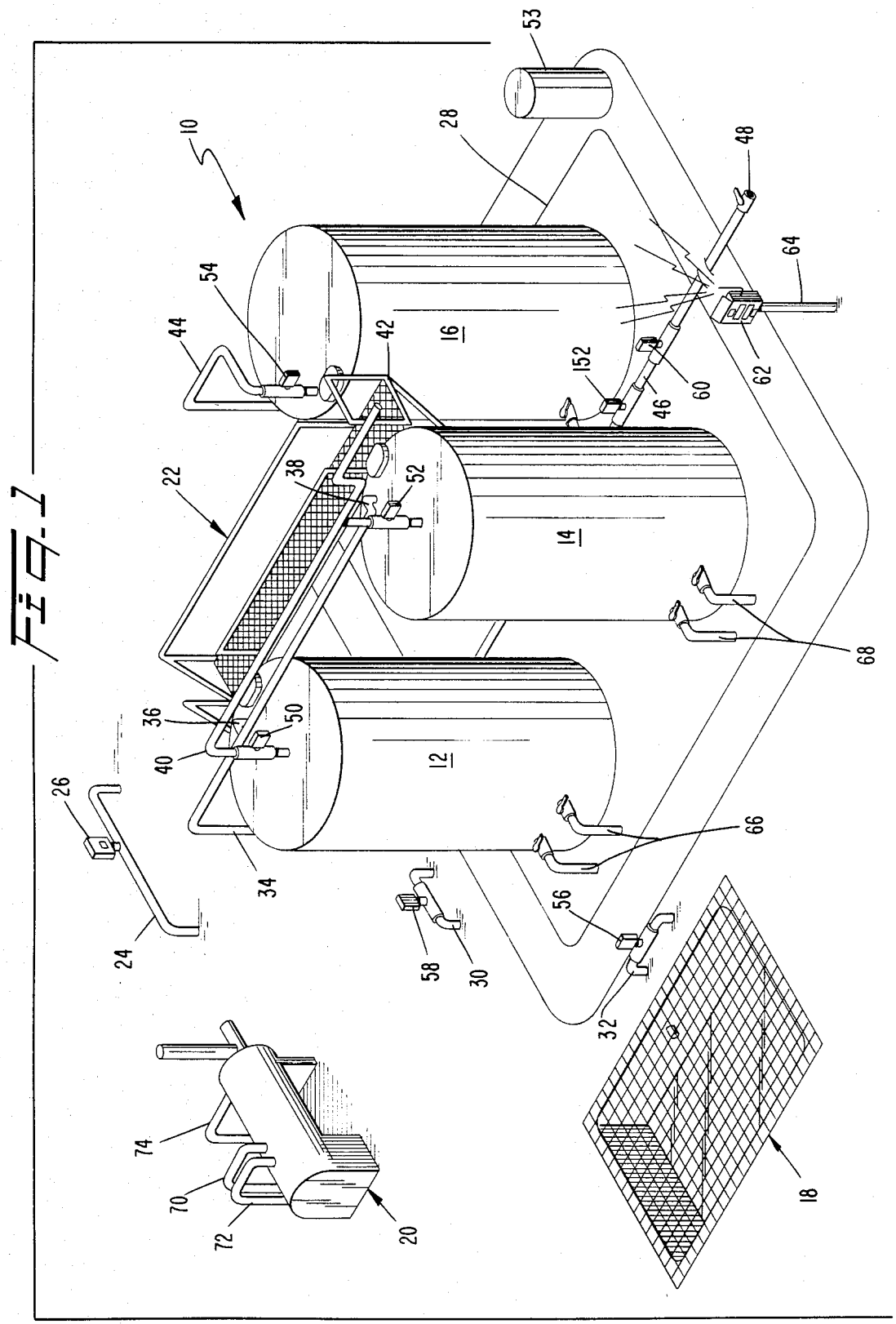
FIG. 1 shows a perspective view of a first embodiment of tank battery in accordance with the present invention.

FIG. 1 shows a first embodiment of tank battery 10. The battery 10 includes an oil tank 12, an oil tank 14, a water tank 16, a heater/treater 20 and a water overflow sump 18. The heater/treater 20 includes an inlet pipe 74 from an oil well (not shown), a first output line 70 for oil and a second output line 72 for water. As is well known in the art, oil producing wells also inherently produce natural gas, and as such a line 24 including gas meter 26 is provided in the system for the purpose of measuring this gas production and transporting gas to a storage facility (not shown). FIG. 1 also shows a plurality of conduits connecting various components of the system. A line 30 is shown which connects the heater/treater output line 72 with an inlet (not shown) to the water tanks 16. A further line 32 connects outlet pipes 66, 68 on respective oil tanks 12, 14 with the water overflow sump 18 so as to enable draining off of any water accumulating in the oil tanks. A fill line 34 connects with heater/treater output lines 70 and includes ports 36, 38 which communicate with the interior with respective tanks 12 and 14 so as to enable the filling thereof with oil from the output line 70. A common vent line 40 with an outlet port 42 is provided at the top of oil tanks 12 and 14 and a further vent 44 is provided for the water tank 16. A sales line 46 is provided for transporting oil from the tanks 12 and 14 to the customers via valve 48. The system of the present invention as shown in FIG. 1 encompasses a master control unit 62 mounted on post 64, level transducers 50, 52 and 54 mounted on the vent lines of the respective tanks 12, 14 and 16, basic sediment and water sensors 56, 58 and 60 mounted on respective above described lines 32, 30 and 46 and electrical circuitry (not shown) connecting the various sensors with the master control unit. As further shown in FIG. 1, the tank battery includes a cat-walk 22 and a platform 28 which supports the respective tanks 12, 14 and 16.

With reference now to FIG. 2, another embodiment of tank battery 100 is shown. This embodiment only differs from the tank battery 10 of FIG. 1 as including a gravitational separator 120 instead of the FIG. 1 heater/treater 20 and as further including an open water tank 116 instead of the FIG. 1 sealed water tank 16. As such, the other elements shown in FIG. 2 are referred to by like primed numerals corresponding to the unprimed numerals of FIG. 1.

FIG. 3 shows a perspective view of the master control unit 62 as mounted on the post 64. As shown in FIG. 3, the master control unit includes a box 63 in which the components thereof are contained. Located within this box 63 and not shown is a storage battery or batteries which provide the power to operate the master control unit 62. In order to enable the recharging of this battery or batteries, a solar charging unit 80 is shown mounted on the top portion of the box 63 which collects the rays of the sun and converts them to energy usable to recharge the batteries. As further shown, the master control unit includes a face 82 which has mounted therein a display 84, a set of inputting keys 86 which comprise a key pad, a manually operated card reader 88 and an RS-232 interface 90 which connects an umbilical cord 92 which connects with a portable memory device 94 which may, if desired, comprise a bubble memory. As further shown in FIG. 3, an antenna 65 is mounted on the side of the box 63 and this antenna provides the optional telemetry functions noted above.

Referring now to FIG. 4, the face 82 of the box 63 is shown in greater detail. As shown in FIG. 4, the display 84 includes preferably an LED or LCD readout including at least 4 numerals which enables data punched into the key pad 86 to be displayed thereon as well as output data. The key pad 86 is shown to include 12 buttons 10 of which may correspond to the numerals 0-9 and further functions and the other two of which comprise "level" and "DCB" buttons. The numerical pneumonic keys are provided so that a password and other data may be keyed in in conjunction with the inserting of an identification card into the manual card reader 88. Thus, after inserting such a card into the manual card reader 88, the card holder may punch in a security password into the numerical keys which accesses such individual to the system. By pressing the input key labeled "level," and by further inputting numerical keys responding to an identification code for the particular tank the level of which is desired to be known, such level will be displayed on the display 84. When an authorized employee inserts a card into the card reader 88 and inputs the proper password into the input keys 86, such employee may further press the "DCB" key to thus enable transferring of data from the master control unit 62 inboard memory to a portable memory device which may be connected as shown more particularly, in FIG. 3, to the interface 90.

With reference to FIG. 5, the internal circuitry of the master control unit 62 is shown in block diagram form. This circuitry includes a microprocessor 81 which may be an Intel 80-C-35 device, a read only memory 83, a random access memory 85 which may if desired store up to 60 days worth of data, an input/output device 87 including further random access memory 87 which may, if desired, comprise an Intel 81-C-55, a real time clock 89 which enables the microprocessor 81 to keep track of time on a real time basis and which triggers the operational status of the microprocessor 81 to perform periodic data measurements both automatically and subject to the insertion of an authorized card and the inputting of an authorized password. The system further includes keyboard display 91 which may comprise an Intel 8279, RS-232 interface 90, which may comprise an Intel 8251 device. As further shown in FIG. 5, the input/output device 87 has connected thereto interface devices 95 and 96 for the respective basic sediments and is manual to conserve power. The interface 95 has connected thereto the basic sediments and water sensors 56, 58 and 60 whereas the level sensor interface 96 has connected thereto the display 84 and the key pad 86 while the RS-232 interface 90 is shown with the data collection box 94 connected thereto which may comprise a bubble memory as stated above.

The data collection box 94 houses bubble memory and support electronics. The bubble memory is non-volatile and will function over a wide temperature range, has little sensitivity to shock, vibration, or stray fields. The device is thus protected from any type of data tampering or tampering with the mechanism itself. The amount of data storable therein is sufficient to allow the sampling of multiple tank batteries before the contents thereof must be read and removed. The individual operators will be provided with the proper software programming to enable the reading of the contents of the bubble memory into any computer which includes an interface corresponding to the RS-232 interface 90. The software will translate the data into a written record such as a gauge sheet, receipt ticket or run ticket. If desired, the program may be written in a standard computer language such as "MBASIC" or "PASCAL."

The master control unit 62 as above described comprises a remote tamper proof box which houses the microcomputer 81 and interface electronics. As shown in the figs. it is desirable that the master control unit be mounted near the sales valve 48. The random access memory 85 may include a capacity of at least 64K×8, while the read only memory 83 may include a capacity of at least 8K×8. Preferably the input/output device 87 comprises a three eight bit configuration and the components where possible are made of CMOS electronics so as to ensure low power consumption. If desired, all human interface electronics may be mounted on one circuit board card within the master control unit 62 to allow for easy system upgrading and maximum system flexibility. A mother board or other card interconnect scheme will be provided within the master control unit 62 to enable the plugging in of the various boards which comprise the system. The display 84 may comprise LED or LCD crystals and may also display both memory transfer and indications of low battery conditions. If desired, the display will include four displays including 7 segments, however, as many displays as are desired may be incorporated into the system. The key pad 86 is designed to be environmentally sealed in view of the extreme weather conditions which are sometimes found at the remote oil well sites. As stated above, the magnetic card reader 88 is provided as a manual unit so as to provide savings in power consumption, however, where access to power lines is available, this card reader 88 may be provided as a motorized card reader.

Applicant has tested a number of card readers and has determined that the S R and D Corporation model MCR-1911R(ABA) manual card reader is suitable for use in the present invention and further the Sankyo model MCM-2310-1R1A manual magnetic stripe reader is also suitable for use in the system. These card readers should only be considered to be examples of card readers which may be used with the system, as any manual or motorized EPROM optical or magnetic card reader may be used in the system depending upon the particular circumstances of the installation.

Referring now to FIG. 6, a cross-section of the tank 12 is shown as well as details of the level transducer 50. Preferably, the tank 12 includes the original vent pipe 40 and the transducer housing 50 which is inserted between the vent pipe and the tank. As shown, the tank 12 includes a vent pipe 40 which is comprised of an elongated section 130 and a right angle section 132 including a sealing cap 134 which sealingly and structurally supports a stem 138. At one end of stem 138 a sealed condolet 140 is mounted to the level transducer and comprises an interface between the level transducer and the above described microprocessor portion of the master control unit 62. At the other end of the stem 138 a support device 142 is connected which supports the level transducer 144. Electronic circuitry is threaded through the hollow stem 138 and connects the level transducer 144 with the sealed condolet 140. As shown in FIG. 6, the level transducer 144 is preferably of the ultrasonic type and emits a beam of sound 146 which is reflected off the surface 148 of the oil so as to cause an echo 150 to return to the transducer 144. Through knowledge of the particular location of the transducer 144 with respect to the tank 12, the oil level 148 may be calculated through determination of the time period from the emission of the beam 146 to the return of the echo 150. The ultrasonic transducer assembly 50 will preferably be self calibrating as described later. As further shown in FIG. 6, a plurality of temperature sensing elements 152 are provided which also connect to the master control unit 62. These temperature sensors are provided so as to enable compensation for the difference in oil volume with varying temperatures. As such, the oil level 148 may fluctuate due to varying oil temperatures without the addition or removal of oil to or from the tank 12. The data received from temperature sensors 152 is included in the calculation of the oil level so as to compensate it to a predetermined temperature. A temperature sensor 152 is also provided in sales line 46.

In the preferred embodiments of the present invention, the ultrasonic transducer may, if desired, consist of a device manufactured by Polaroid and referred to by Polaroid as the "Ultrasonic Ranging System." This system may operate over a distance range of from 0.26 millimeters 10.7 meters through adjustments of the amplifier gain thereof. It is to be stressed that the Polaroid system is merely one example of a system which may be utilized in conjunction with the present invention. Any ultrasonic transducer which may be mounted in a tank vent is usable with the present invention. Further, other types of ranging systems where desired may also be used besides those of the ultrasonic type.

With regard to the above described basic sediments and water sensors, any device that performs this function is usable as integral part of the present invention. One example of such a sensor which is suitable for the purposes of the present invention comprises those which are manufactured by Invalco Process Equipment Company and designated by models 1728 and 1864. The B S and W sensors may also, if desired, be supplied by other sources and are modified where necessary to properly interface with the inventive system. Generally speaking, a B S and W sensor package is comprised of two aspects, (1) a probe, and (2) associated electronics. The probe acts as a variable capacitor and the capacitance variance results from the change in the dielectric constant of the fluid flowing between the plates thereof. Pure oil has a different dielectric constant than oil with water and sediments and thus this difference is used to measure oil purity.

The associated electronics includes a capacitance bridge circuit with the probe forming one leg of the bridge. A varying voltage output from the bridge results from variations in probe capacitance. Two different versions of B S and W sensor package may be used in the present invention. Referring to FIG. 7, a qualitative sensor is shown to include a probe 170, a bridge circuit 172 and a voltage comparator 174. The voltage comparator 174 compares the voltage output of the bridge circuit 172 with a reference voltage and when the comparator 174 senses a bridge voltage exceeding the reference voltage, an indication of B S and W content exceeding a predetermined level, the comparator 174 sends a digital signal to the microprocessor 81 to inform it of this condition.

Referring to FIG. 8, the quantitative type sensor includes the probe 170', bridge circuit 172' and a voltage to frequency converter 176. The converter 176 receives a voltage signal from the bridge circuit 172' indicative of the B S and W content, converts it to a frequency signal and continuously transmits the frequency signal to the microprocessor 81. A frequency signal is used to minimize effects of electromagnetic noise and allow transmission over long distances. It is to be stressed that while the Invalco B S and W sensors are suitable for use with the system of the present invention, any B S and W sensors which will sense the basic sediments and water content within the desired percentage ranges as contemplated by the present invention may be employed as an integral part therewith.

As stated above, several options are available as add-ons to the basic system as described hereinabove. These options will now be explained.

A first option contemplated for use in combination with the inventive system comprises the incorporation into each valve within the system (FIGS. 9–12) of a lock housing over the valve. FIG. 9 shows, for example, the conduit 46 with sales valve 48 thereof covered by housing 180. An opening 181 in the housing 180 is covered by a cover 182 which pivots about a pin 183 rotatably retained in housing 180 hole 184. As shown in FIG. 12, the housing 180 has mounted therein a plunger 185 which engages the inside of a downwardly projecting lip 186 on cover 182 when the cover closes the opening 181 to lock the cover in place thereover.

FIGS. 10 and 11 show two respective actuation systems for the plunger 185. In FIG. 10, the plunger 185 is fluid actuated and includes a cylinder 187, piston 188 rigidly connected to plunger 185, a spring 189 which biases the plunger 185 to the locked position, vent 190 and port 191 connected to $N_2$ gas cylinder 53 also shown in FIG. 1 through line 192. A solenoid valve 193 is provided in the line 192 and is connected through wires 194 to the master control unit 62. When it is desired to unlock the cover 182, the master control unit 62 actuates solenoid valve 193 so as to open line 192. Nitrogen gas from cylinder 53 then pressurizes chamber 195 to reciprocate piston 188 and plunger 185 downwardly against the force of spring 189 with air in chamber 196 venting through vent 190. When it is desired to lock the cover 182 in place, the master control unit 62 actuates the valve 193 to the closed position to thereby depressurize chamber 195 and allow spring 189 to reciprocate piston 188 and latch 185 upwardly to lock under lip 186. If desired, the valve 193 may be of the "supply and exhaust" type either supplying the chamber 195 with gas or exhausting the chamber 195 to atmosphere to thereby ensure depressurization thereof.

FIG. 11 shows a second embodiment of actuator for plunger 185 which is purely electrical. As shown, the plunger 185 forms an integral part of the plunger for a first solenoid 201, which includes an electrical winding 203. The plunger 185 is made of a magnetically attractive material such as iron and includes an annular projection 205 which confines a spring 207 between it and the winding 203 to thereby bias plunger 185 to the locked position. The plunger further has two notches 209, 211 formed therein for a purpose to be described hereinafter. As shown, a second solenoid 213 is mounted in the housing perpendicular to the solenoid 201 and includes identical structure, to wit, electrical winding 215, plunger 217, plunger projection 219 and spring 221, the sole difference lying in the lack of notches in the plunger 217. In operation, when the cover 182 is to be locked, the solenoids 201, 213 are in the position shown with the plunger 185 under lip 186 and the plunger 217 within notch 209 to lock plunger 185 in position. When it is desired to open cover 182, the solenoid 213 is first activated to reciprocate plunger 217 from notch 209, and the solenoid 201 is then activated to reciprocate the plunger 185 away from lip 186 to allow cover 182 to be pivoted to the open position thereof. Before the solenoid 201 is deactivated, the solenoid 213 is deactivated to allow spring 221 to reciprocate plunger 217 into notch 211 to lock plunger 185 in the down position. At this point, solenoid 201 may be deactivated with the plunger 217 remaining in notch 211. From this orientation, to lock the cover, the solenoid 213 is activated to reciprocate plunger 217 away from the notch 211. The spring 207 reciprocates plunger 185 upward to the inner portion of lip 186 to thereby lock the cover 182. Finally the solenoid 213 is deactivated to allow spring 221 to reciprocate plunger 217 into notch 209 to lock plunger 185 in position. The above described sequences of operation are controlled by the master control unit 62, and the order of operations comprises a sort of combination lock requiring the particular sequence to be followed in order to gain access to the valve. This option is considered to be important as it prevents many instances of covert theft of oil as requiring a proper identification card before the sales line valve 48 may be opened. Of further importance through the addition of this option, is the ability to prevent the theft of oil through the outlets 66 and 68. Once basic sediments and water are removed through these outlets 66 and 68 all that would remain in the tanks 12 and 14 would be pure oil. By requiring the use of an identification card and a password before the valves associated with lines 66 and 68 may be opened, any theft of the oil in the tanks 12 and 14 would be associated with this identification card and consequently with the holder thereof.

As stated above, an additional option which is contemplated for use in conjunction with the present invention comprises a telemetry option. Referring back to FIG. 3, an antenna 65 is shown extending outwardly from the master control unit box 63. When this option is employed, the master control unit 62 may be controlled from a remote location within range of the radio transmissions from the antenna 65. Further, it would be possible through a coded access signal to transfer the stored memory from the random access memory 85 to a central facility memory without having to use the bubble memory portable memory 94. Further, through the use of this telemetry option, any malfunctions in the system such as, for example, overflows of the tanks, malfunctions in the heater/treater 20 such as overheating and stoppage or malfunctions in the gravitational separator 120 such as pump malfunctions, defects or malfunctions in the various level and basic sediment and water sensors, as well as the temperature sensors would be transmitted to this central facility so as to enable maintenance personnel to be advised of the situation and take the appropriate action by traveling to the tank battery site. Further, any transactions at the tank battery whether authorized sales or unauthorized thefts whether they be covert or overt as well as changes in the rate of production would be transmittable to the central facility by the master control unit 62 and antenna 65. In this way, the fact that most tank batteries are located in remote locations would be overcome by the ability to carefully monitor the tank battery from a remote location. In this vein, the telemetry system could further include recording cameras located at strategic places within the battery which could show pictures whether they be movies or video tapes of vehicles and/or persons involved in theft as well as vehicles and persons involved in authorized sales transactions. Further, the telemetry system could be wired so as to enable it to transmit, on command, data to aircraft overflying the battery or further via satellite to the central facility. Through this telemetry device, the central facility could order the master control unit 62 to open a valve, to start such a recording camera, or perform any other battery function. Further, it is contemplated that a marking system might be provided within each oil tank to be actuable by the master control unit 62 either at the tank battery site or remotely from a central facility so as to enable oil which is stolen or is about to be stolen to be later identified for purposes of proving a theft. One such marking system comprises what is known in the art as a "celluloid identifier" which comprises tiny microscopic particles which may be seen under a microscope and which may include identifying markings particularly designed so as to be identifiable by the operator of the tank battery. Such a marking system would prevent theft through its deterrent effect by enabling the operator of the tank battery site to identify oil which has been stolen from him or her. Appropriate signs posted at the tank battery site indicating that such a marking system is being used would act as a deterrent of such theft.

A further option contemplated for use in conjunction with the system of the present invention comprises a set of relay closure alarming circuits of different types and using special software usable in conjunction with master control unit 62. These alarms would:

(1) Sound an alarm when an unauthorized withdrawal occurred;

(2) Sound an alarm if any malfunctions of the heater/treater or gravitational separator occurred;

(3) Sound an alarm when other components of the system such as pump malfunction or when a tank overflows or reaches an inordiantely high level. These alarms could comprise both horns or bells which actuate at the tank battery site as well as signals which may be remotely broadcast to a central facility or a police facility. The above described alarms could be incorporated in conjunction with the earlier described telemetry system so as to activate a camera, release marking systems and/or close various valves in the system.

As stated earlier means may be provided to monitor gas production. With reference to FIGS. 1 and 13 the gas line 24 may include a gas meter 26. As shown particularly in FIG. 13, the meter 26 may take the form of a means for recording the pressure drop across orifice 225. In this case a pressure sensor 227 is placed in the line 24 upstream of orifice 225 and a further pressure sensor 229 is placed in the line 24 downstream of orifice 225 with gas flowing in the direction of arrow 231. The pressures sensed by pressure sensors 227, 229 are transmitted to control unit 233 by way of respective wires 235, 237. The control unit 233 may, if desired, comprise a Taylor-type pen recorder in which a pen marks the pressure drop as calculated from sensors 227, 229 onto a rotary chart. Alternatively, the control unit 233 may comprise a means to transmit the pressure readings received from sensors 227, 229 to the master control unit which performs the pressure drop and flow rate calculations. This approach is much more accurate than the pen recorder approach and enables computation of gas production on site.

Having now described the basic system of the present invention as well as proposed options includable therewith, the operation of the system from a logic standpoint will now be described.

The system as above described has three basic modes of operation: (1) the sleep mode, (2) a mode wherein illegal transfer is detected, and (3) the mode in which a normal transfer occurs. In the sleep mode, once every 15 minutes or other predetermined increment of time, the microprocessor 81 will be woken up by the real time clock 89 and a tank reading will than occur. If the reading detects a change in the rate of production of the tank, then the new rate of production will be stored. Otherwise the data will not be stored and a person reading the data at a later date will note therefrom only the times when the rate of production has changed and not the actual level for each reading. This feature is included so as to save memory as it is not necessary to record in the memory time after time the same rate of production. From a reading of the memory, it becomes self evident when the production rate was at a certain level and when it changed to different levels. In the above manner, each tank in multiple tank installations will be sampled. Further, the basic sediment and water content of water coming out of either the gravity separator 120 or the heater/treater 20 will be sampled at this time. This sampling will provide a check for proper operation of either device and will also enable the detection of any tampering therewith. If any tampering or irregularities are detected, further steps will be taken by the system as explained below. In the second mode, when an illegal transfer has been detected, which in the basic system would be at the incremental time period when a reading has been made or, in options to the system, when a valve opening is sensed, the microprocessor 81 will sample the level of the tank in question. The basic sediments and water of the water going into the water overflow sump 18 is also sampled to detect whether oil is being stolen from the outlet 66, 68 and the basic sediments and water content, and water temperature of the oil in the sales line 46 are also sampled. The microprocessor then stores all of these measurements along with the time of day thereof. With continuous monitoring, changes in these measurements will also be stored and rereadings will be made every two minutes or other desired small increment of time until the level ceases to change in a downward direction. At this time, the system will return to the sleep mode. If desired, the alarm and telemetry options described earlier in the specification may be used in this illegal transfer detection mode so as to sound alarms, mark the oil, transmit information as to the theft to a central facility and/or actuate the various valves to the closed positions thereof. The third mode, that of normal transfer, commences when the microprocessor 81 detects a proper identification card having been placed within the card reader 88. When the proper password has been entered on the key pad 86, the time and card number will be stored. Further description of this mode will be described hereinafter, however, it is noted that two situations within this mode occur other than the situation wherein oil is being removed in an authorized fashion from a particular tank. A first situation occurs when an individual with the proper card and the proper password wishes to transfer the memory from the random access memory 85 to the portable memory 94 as shown in FIG. 3. In this situation the operator after having placed his identification card in the card reader 88 and having keyed in the proper password in the key pad 86 depresses the key labeled "DCB." This key commands the microprossesor 81 to dump its memory into the portable memory 94 and it will only do so when such a portable memory is connected through an umbilical cord 92 to the RS-232 interface 90. A further situation occurs when it is desired to read the level of a particular tank or tanks within the battery. In this situation, after the microprocessor 81 detects that a proper card has been inserted into the card reader 88 and a proper password has been entered into the key pad 86, upon depressing of the key pad button labeled "level," and the entering into the key pad of a number corresponding to the tank the level of which is desired to be read, the level of that tank is than displayed on the display 84 and this measurement is stored. At this point, the microprocessor 81 goes into its monitoring mode and calculates the total oil transferred and the average basic sediment and water level and temperature for the transfer which information is stored along with the card number and the time of day.

Now in flow chart form, the preferred mode of operation of the system will be described.

In the monitoring mode, when the microprocessor 81 is woken up by the real time clock 89, the microprocessor reads a particular tank level. If the reading reveals the fact that the rate of change is consistent with the previous reading the microprocessor than returns to the sleep mode and will be rewoken up after a pedetermined increment of time. On the other hand, if the rate of change is different than it was in the previous reading, the microprocessor will then read the basic sediment and water content from the water overflow sump 18, will read the basic sediments and water content and the temperature of the sales line 46, will read the time of day and will store this data. The microprocessor 81 will than wait for a small increment of time such as, for example, two minutes and then will repeat the reading process and will continue to do so until the readings stabilize longer decreasing. At such time, the microprocessor will return to the sleep mode.

When the microprocessor 81 through its internal circuitry detects a low battery condition which may prevent it from performing its functions, the microprocessor 81 disables the entire system until such time as the solar cells 80 or other battery recharging devices recharge the battery to sufficient level to allow the system to operate in a normal fashion. If a telemetry option has been included with the system, the low battery condition may be broadcast to a central facility so that maintenance personnel may travel to the tank battery site to correct this condition.

When a proper identification card is inserted into the card reader 88, and subsequently a password is keyed into the key pad 86, the microprocessor 81 determines whether the password was correctly inputted. If it was not inputted, the microprocessor 81 allows the card holder to try another time to input the proper password. After a predetermined number of retries, the card number and time are recorded and stored in the memory 35. If desired, the card reader 88 may be provided with a device which will retain the card after a predetermined number of retries have occurred. If on the other hand the password that was entered is correct, the microprocessor 81 directs that the card number and time be stored in the memory 85 and than waits for the next keyboard entry. If this keyboard entry orders the microprocessor to perform a tank level read, the microprocessor 81 orders the level transducer to send an echo and simultaneously start a timer. The microprocessor records the time elapsed to the first echo and then records the time elapsed to the second echo. From this information and knowledge of the specific geometry of the transducer with respect to the tank, the volume of fuid therein is then calculated. The above noted sequence of readings is repeated until two consecutive readings are within one quarter inch of one another. If after a predetermined number of retries, two consecutive readings are not within a quarter inch of one another, this malfunction in the transducer is recorded through the telemetry option to the central facility or is stored in the memory 85 so that the exact time when the malfunction occurred may be noted by the operator of the facility.

If desired, the key pad 86 may also include a button which directs the microprocessor 81 to read the basic sediments and water content at any of the three locations thereof. When this button is pushed, the B S and W sensor which has been activated operates in its usual manner to measure both the reference capacitance and the basic sediments and water capacitance. These values are transmitted to the microprocessor 81 which then calcuates the basic sediments and water content in the particular line being tested.

It is noted here, that various modifications may be made to the components of the system to adapt them to use with the microprocessor 81. In this regard, the basic sediments and water sensors and the level sensors will both use frequency and coded data. A means will be employed to translate the frequency data into digital data. Frequency encoding will ensure minimum sensitivity to noise and allow for transmission of data over longer distances. The level transducer will use a self-calibrating feature minimizing the sensitivity to temperature and foreign gases. A reference echo will be sent due to the impedance mismatch between the transducer housing and the open tank-vent interface. This echo will travel a known reference distance $D_{ref}$ calibrated in the factory and the first echo corresponding to the distance $D_{ref}$ returns to the transducer in a time of $T_1$.

The unknown distance to the oil level $D_{unknown}$ can thus be calculated by a simple ratio $(T_1/D_{ref}) = (T_2/D_{unknown})$. The times $T_1$ and $T_2$ and distances $D_{ref}$ and $D_{unknown}$ are shown schematically in FIG. 6. This method reduces the sensitivity of the transducer to changes in the speed of sound, and any such changes thereby change the value of $T_1$.

The basic sediments and water transducers use capacitance as the variable being measured. The changing capacitance will be converted into a frequency and will in this form be sent to the microprocessor 81. A reference capacitance will first be sent, again as a self-checking feature.

The voltage output of the various temperature transducers will also be converted into a frequency encoded type data. As above, a refeence voltage will be converted and sent to the microprocessor 81 as a self-checking feature.

While the invention has been disclosed herein in connection with certain embodiments and certain structural and procedural details, it is clear that changes, modifications, or equivalents may be used by those skilled in the art without departing from the intended scope thereof. Accordingly, such changes and modifications are considered to fall within the purview of the invention and the invention is intended only to be limited by the following claims.

We claim:

1. A measuring, testing and accounting system for use in conjunction with a tank battery, said tank battery including:
   (a) a liquid separator for separating a liquid mixture into at least two constituent liquids;
   (b) at least one tank for one of the constituent liquids;
   (c) conduit means connecting said liquid separator with said at least one tank;
   (d) outlet pipe means extending from said at least one tank; and
   (e) valve means in said outlet pipe means for controlling fluid flow through said outlet pipe means; said system comprising:
   (a) level sensor means located in said at least one tank for detecting the level of fluid therein;
   (b) temperature sensor means located in said outlet pipe means for determining the temperature of fluid in said outlet pipe means;
   (c) basic sediments and water sensor means located in said outlet pipe means for determining the purity of fluid in said outlet pipe means; and
   (d) self-powered master control unit means operable on a real time basis and connected to said level, temperature and basic sediments and water sensor means and receiving signals therefrom so as to enable the monitoring of said tank battery on site.

2. The invention of claim 1, wherein said tank battery further includes a gas line and said system further includes means for measuring the flow rate of gas in said gas line.

3. The invention of claim 2, wherein said flow rate measuring means comprises an orifice in said gas line, pressure sensors mounted in said gas line upstream and downstream of said orifice, and means receiving signals from said pressure sensors indicative of the pressure both upstream and downstream of said orifice.

4. The invention of claim 3, wherein said receiving means includes pen recorder means.

5. The invention of claim 3, wherein said receiving means includes means transmitting said pressure sensor signals to said master control unit means, said master control unit means calculating the gas flow rate.

6. The invention of claim 1, wherein said master control unit means is programmed to compute the volume of liquid (1) stored in said at least one tank and (2) discharged from said valve means, and is further programmed to compensate for the temperature and basic sediments and water content of said liquid.

7. The invention of claim 1, wherein said master control unit means includes card reader means for reading identificaion card means carried by subscribers and personnel of said tank battery, said master control unit means being programmed to store information received from said identification card means so as to enable identification of individuals at said tank battery.

8. The invention of claim 1, wherein said system further includes first alarm means which is activated by unauthorized withdrawal of liquid from said tank battery.

9. The invention of claim 8, wherein said system further includes second alarm means which is activated by malfunctions in said system.

10. The invention of claim 9, wherein said master control unit means is programmed to store information as to the real time and nature of any activation of said first and second alarm means.

11. The invention of claim 10, wherein said master control unit means is equipped to transmit instantaneously information as to the nature of any activation of said first and second alarm means.

12. The invention of claim 1, wherein said master control unit means is equipped to transmit to a remote location any data in a memory portion thereof upon request from said remote location.

13. The invention of claim 1, wherein said master control unit means is self-powered by a solar battery pack.

14. The invention of claim 1, wherein, the master control unit means records in a memory portion thereof the real time for all functions thereof including accessing thereto by individuals.

15. The invention of claim 1, wherein said tank battery may receive said liquid mixture from a plurality of locations, and further wherein said system includes pressure sensor means located in each conduit means connecting a respective location with said tank battery and each pressure sensor means transmitting data received thereby to said master control unit means.

16. The invention of claim 1, wherein said master control unit means records in a memory portion thereof the rate of production of said tank battery and further transmits to a remote location information indicating the sensing of a rate of production exceeding a predetermined level.

17. The invention of claim 1, wherein said system further includes a further temperature sensor below the liquid level in said at least one tank and said level sensor means compensates for the particular ambient atmosphere therein.

18. The invention of claim 17, wherein said level sensor means comprises ultrasonic level sensor means.

19. The invention of claim 1, wherein said master control unit means further includes interface means enabling connection thereto of a portable memory for removal of information from memory means in said master control unit means.

20. The invention of claim 1, wherein said system further includes lock means for preventing unauthorized opening of said valve means.

21. The invention of claim 20, wherein said lock means comprises a cover for said valve means and latch means for releasably retaining said cover in a closed position.

22. The invention of claim 21, wherein said latch means comprises a fluid pressure operated reciprocating rod, a conduit connecting a source of fluid pressure to a chamber containing a piston connected to said rod, and solenoid valve means controlling flow through said conduit and controlled by said master control unit means.

23. The invention of claim 21, wherein said latch means comprises a first solenoid actuated rod forming a latch and a second solenoid actuated rod insertable into notches formed in said first rod to retain said latch in defined positions at least one position of which locks said cover in a closed position and at least another position of which allows said cover to be opened.

24. The invention of claim 1, where said basic sediments and water sensor is qualitative and converts a voltage signal indicative of the sensed level of basic sediments and water into a frequency signal for transmission to said master control unit means.

25. The invention of claim 1, wherein said tank battery further includes a water overflow sump, and further outlet pipe means connecting said at least one tank with said sump, and further basic sediments and water sensor means in said further outlet pipe means.

26. The invention of claim 25, wherein said basic sediments and water sensor means comprises a quantitative sensor whereas said further basic sediments and water sensor means comprises a qualitative sensor.

27. The invention of claim 1, wherein said tank battery includes a plurality of tanks for one of said constituent liquids and at least one tank for another of said constituent liquids, and each of said plurality of tanks includes level sensor means and temperature sensor means.

28. The invention of claim 27, wherein said another constituent tank includes level sensor means and temperature sensor means.

* * * * *